United States Patent
Chauveteau et al.

(10) Patent No.: US 6,579,909 B1
(45) Date of Patent: Jun. 17, 2003

(54) METHOD FOR PREPARING MICROGELS OF CONTROLLED SIZE

(75) Inventors: Guy Chauveteau, Pierre Brossolette (FR); René Tabary, Danês de Montardat (FR); Michel Renard, Mille Feuilles (FR); Aziz Omari, Etourneaux (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 123 days.

(21) Appl. No.: 09/666,567

(22) Filed: Sep. 20, 2000

(30) Foreign Application Priority Data

Sep. 21, 1999 (FR) .............................. 99 11862

(51) Int. Cl.⁷ .............................. B01D 21/01; C09K 3/00
(52) U.S. Cl. .................. 516/99; 516/102; 507/117; 507/120; 507/225; 507/271; 507/903
(58) Field of Search .................. 516/99, 102; 507/117, 507/120, 903, 225, 271

(56) References Cited

U.S. PATENT DOCUMENTS

| | | | |
|---|---|---|---|
| 4,172,066 A | * 10/1979 | Zweigle et al. | ............. 507/117 |
| 4,182,417 A | * 1/1980 | McDonald et al. | ......... 507/117 |
| 4,670,165 A | 6/1987 | Black | |
| 5,569,364 A | * 10/1996 | Hooper et al. | ................ 516/99 |
| 5,642,783 A | 7/1997 | Moradi-Araghi | |
| 5,789,351 A | 8/1998 | Ahmed et al. | |

FOREIGN PATENT DOCUMENTS

EP 604988 7/1994

* cited by examiner

*Primary Examiner*—Philip Tucker
(74) *Attorney, Agent, or Firm*—Antonelli, Terry, Stout & Kraus, LLP

(57) ABSTRACT

The present invention relates to a method for preparing microgels of controlled size. According to the method, a gelling composition comprising a polymer and a crosslinking additive intended for the polymer is injected into a porous and permeable medium, and a monodisperse solution of microgels of substantially constant size is recovered at the outlet.

The invention also relates to an application of the method for reducing the permeability of porous and permeable formations of reservoir rock type.

11 Claims, No Drawings

METHOD FOR PREPARING MICROGELS OF CONTROLLED SIZE

FIELD OF THE INVENTION

The object of the present invention is a method allowing to prepare microgels of controlled size by subjecting a composition mainly consisting of a solution of polymer and of a crosslinking agent to a stress imposed for a defined time.

BACKGROUND OF THE INVENTION

Fast production of water in oil or gas producing wells has always posed a major problem for petroleum operators:
- equipments for water separation and treatment are required and generate costly investments, notably in the field of offshore production,
- production of water in wells limits the profitability of hydrocarbon reservoir development,
- severe regulations for controlling discharges, notably of industrial waters, require the problem to be solved in the reservoir rather than in terms of surface treatment.

Known solutions for preventing water inflows in a hydrocarbon reservoir are most often non-selective injection methods based on treatment of the reservoir rock by injection of a polymer solution.

The effect of the treatment is directly related to the ratio of the thickness of the adsorbed polymer layer to the mean pore radius in the treated layer.

Within the range of low to medium permeabilities, the thickness of the adsorbed layer can be controlled by adjusting the molecular weight of the polymer used.

Treatment of formations of higher permeability requires greater adsorbed layer thicknesses that cannot be obtained by a polymer alone.

The main advantage of using a polymer alone lies in the fact that well clogging risks are low in relation to the risk linked with the use of gelling systems. However, the intensity of the effect remains limited since it is constrained only by the osmotic expansion of the polymer molecule in the reservoir water.

Crosslinking of the polymer by a gelling agent is the most widely used method for improving the efficiency of polymer injection in order to reduce water inflows. Crosslinked polymers are generally more stable than a polymer alone in severe environments (high salinity, high temperature for example). The method however remains uncertain as a result of a bad control of the crosslinking process, which leads to high risks of oil production reduction and even of total or partiel well clogging.

In fact, gelation tests are very often carried out under static conditions and the results obtained, often limited to gel strength classifications according to visual criteria, are very different from the behaviour of the system under dynamic conditions, i.e. the conditions of injection into the formation by means of a well.

The objective of selective treatment of reservoir formations (relative permeabilities modification) with a polymer/crosslinking agent system is to decrease the mobility of the water in the rock without reducing the mobility of the oil so that hydrocarbon production can continue.

To give a rough estimate, in the case of layers whose permeability ranges for example between 2 darcys and 50 millidarcys, a layer having a thickness respectively ranging between 5 $\mu$m and 1 $\mu$m has to be formed at the surface of the pores in order to reduce the permeability to allowable limits without layer damage risks due to retention phenomena.

Such layer thicknesses can only be obtained by adsorption of aggregates or microgels whose size can be controlled.

DETAILED DESCRIPTION OF THE INVENTION

The present invention thus relates to a method for preparing monodisperse microgels of controlled size. A gelling composition comprising a polymer and a polymer crosslinking additive is injected into a porous and permeable medium, and a solution of microgels of substantially regular size is recovered at the outlet.

The polymer and the crosslinking additive can be brought into contact at the inlet of the porous medium. Introduction of the compounds into the medium can be done together (after premixing) or separately, mixing taking place, in this case, in the porous medium.

The flow rate and the time of transit of the composition in the porous medium can be determined so as to obtain a given size for the microgels at the outlet, considering the porosity and the permeability of the medium.

The porous medium can consist of a granular material mass such as sand with a grain size ranging between 50 and 2000 $\mu$m.

The porous medium can consist of a filtering cloth such as a filter cartridge.

The microgel solution can be stabilized as it leaves the porous medium by eliminating the possible excess amount of crosslinking additive.

The gelling composition can consist of polyacrylamide crosslinked by a complex compound of the metallic zirconium ion.

The microgel solution can be stabilized by carrying out at least one of the following stages:—the solution is diluted,—the pH value is increased,—a complexing agent intended for the crosslinking additive is added.

The invention also relates to an application of the method wherein the microgel solution is injected into an underground rocky formation in order to modify the permeability thereof. The application more particularly relates to preventing water inflows so as to reduce the relative water permeability.

The document entitled <<Controlling In-Situ Gelation of Polyacrylamides by Zirconium for Water Shutoff)>>—SPE International Symposium on Oilfield Chemistry—Houston, Tex., Feb. 16–19, 1999 (SPE 50,752) describes a theoretical crosslinking model that has been worked out for a polyacrylamide system in the presence of an external crosslinking agent: a complex compound of the metallic zirconium ion. This model allows to better understand molecule aggregation mechanisms under shear conditions. The results obtained have been validated on other gelling systems, for example polyacrylamide in the presence of chromium acetate which is widely used in the petroleum industry. Because of environmental restrictions, crosslinking agents based on group IV metallic compounds can be preferred for their non-toxicity (Ti, Zr, Hf). Zirconium lactate has been preferably used. Salts of other oxyacids can also be used: malate, tartrate, glycolate, citrate, . . . The stability and therefore the reactivity of the metallic complex compound depend on the nature thereof. Similarly, metalalkanolamine (amine OH-metal) or polyhydroxyl-carboxylic acid complex compounds can be used, as well as other types of gelling agents:—metallic compounds (aluminium citrate, aluminium sulfate, . . ;—organic compounds (glyoxal, phenol, formaldehyde, polyethyleneimine, . . . ).

The invention is not limited to the gelling systems mentioned in the present description. The polymers can be, for example, non-exhaustively:—neutral, hydrolyzed (anionic) or cationic polyacrylamides,—scleroglucane,—xanthan,—polygalactomannanes, ...

Concerning the polyacrylamide-zirconium system given by way of example, the gelation process is followed through the evolution of the Theological properties of the mixture.

The gelation kinetics depends on various parameters, such as those linked with:
- the chemical compounds of the system itself, i.e.: the molecular weight, the hydrolysis ratio, the polymer concentration, the nature and the concentration of the crosslinking agent and of the possible complexing agent of the crosslinking additive;
- the surrounding physico-chemical conditions: pH value, temperature, salinity;
- the hydrodynamics imposed on the composition: shearing rate.

A polymer solution is a 3D collection of linear chains forming blobs expanded in the solvent. Crosslinking of these chains leads to the formation of aggregates of branched macromolecules of great mass. The branching degree and the molecular mass increase as the crosslinking process progresses.

Under static conditions, the system evolves into a set of polydisperse and entangled aggregates forming a <<solution>> phase. During the crosslinking process, when the size of an aggregate reaches the dimension of the space in which it is, a <<gel>> phase is then present and the viscosity of the system diverges and tends to infinity.

Under shear conditions, all the aggregates whose size reaches a certain critical size break while the smaller ones continue to grow and eventually break when they reach the critical size. This formation process followed by rupture leads to a solution of monodisperse aggregates soaking in the original polymer solution if the crosslinking agent concentration is very low, or only in the solvent in case of excess crosslinking agent.

In fact, this process is an equilibrium situation where deformation brings the aggregates into contact with each other with the probability of formation of larger aggregates. Thus exceeding the critical size, these aggregates break.

Each one of these aggregates is contained in an equivalent sphere of radius $R_a$. Within this sphere, the constitutive blobs are arranged fractally in space and we have:

$$t = R_a^{df}$$

t is the time counted from the instant the polymer is brought into contact with the crosslinking agent, it is proportional to the mass of the aggregate, df represents the fractal dimension of the object.

The aggregate is subjected to the viscous stress $\eta_p^* \gamma$, $\eta_p$ is the viscosity of the initial polymer solution. This stress generates a viscous torque $\Gamma$ which the aggregate withstands as long as the torque remains below a certain critical value $\Gamma_c$. The rupture criterion is expressed as follows:

$$\Gamma = \eta_p^* \gamma^* R_a^3 \cong \Gamma_c$$

$\Gamma_c$ is directly proportional to the bond strength and the aforementioned criterion shows that the radius of the aggregate varies with the gradient like $R_a \cong \gamma^{-1/3}$.

Furthermore, when writing the continuity of the torques at the interface between the aggregate and the surrounding medium, we obtain:

$$\eta_a \approx \gamma_p^* (R_a/R_p)$$

$\eta_a$ and $\eta_p$ are the respective viscosities of the system and of the initial polymer solution. When the last relations are coupled, the viscosity of the system varies then like $\gamma^{-1}$ (diffusion regime).

Under the conditions mentioned above, the crosslinking agent is in excess and a fraction remains in solution in the presence of aggregates. This fraction can thus lead, with a certain probability, to the formation of intramolecular bonds leading to denser aggregates of smaller radius.

The gelation results obtained at various shearing rates show the validity of this approach. The results are corroborated by size measurements performed by quasi-elastic light scattering and by a size calculation performed from a pseudo-instantaneous determination of the relaxation time of the blob forming the aggregate.

The present method according to the invention consists in subjecting to a controlled shear a solution of an element A (polymer) and a solution of an element B (crosslinking agent) injected into a filtering (shearing) medium, chemically inert, of low adsorption capacity, and which can withstand wear and pressure.

The filtering medium can be a granular filtering mass, in this case a coarse-grained sand (grain diameter of the order of 100 to 500 $\mu$m), or possibly a set of filtering cloths (filter cartridges). The filtering cloth is in fact more expensive and more fragile, it must therefore be supported by a more resistant wire lattice.

The flow rate and the time of flow through the filtering medium determine, according to the operating conditions (molecular mass, viscosity, concentration, pH value, ... ), the size of the aggregates or of the entities leaving the filter.

Elements A and B are preferably injected substantially simultaneously into the filtering medium.

The time of residence in the aforementioned devices will depend on the operating conditions.

The aggregates whose size is defined by the shear, which are collected as they leave the <<filtering>> medium, are stabilized by checking that there is no more excess crosslinking agent at the end of the process or by stopping the reaction by various methods such as dilution of the mixture, by increasing the pH value (in the case of zirconium or chromium), or by adding a complexing agent for the crosslinking additive (sodium lactate in the case of zirconium for example).

The results of the experiments carried out from a given polymer and a given crosslinking agent show that the aggregates can reach dimensions up to 10 times the size of the initial polymer molecule.

The stabilized aggregate solution is then conditioned for industrial use or directly injected into the formation to be treated (production profile control in a well). In this case, permeability control is based, as for a polymer alone, on the principle of adsorption of the aggregates at the surface of the mineral. The thickness of the adsorbed layer directly depends on the size of the aggregates. Reduction of the permeability can thus be adjusted by controlling the size of the aggregates injected.

What is claimed is:

1. A method for preparing microgels of controlled size, comprising:
   providing a polymer and a crosslinking additive for the polymer into a porous and permeable medium;
   controlling the flow rate and transit time of the polymer and the crosslinking additive in the porous and permeable medium to allow crosslinking of the polymer to form aggregates of microgel in the porous and permeable medium and control the size of the aggregates at an outlet of the porous and permeable medium; and recovering a solution including the aggregates of microgel of controlled size.

2. A method as claimed in claim 1, wherein the polymer and the crosslinking additive are mixed to form a gelling composition before being provided into the porous and permeable medium, and the gelling composition is provided in the porous and permeable medium.

3. A method as claimed in claim 1, wherein the polymer and the crosslinking additive are provided separately into the porous and permeable medium.

4. A method as claimed in claim 1, wherein said porous medium consists of a granular material mass.

5. A method as claimed in claim 4, wherein said granular material mass comprises sand having grain sizes ranging between 50 and 2000 μm.

6. A method as claimed in claim 1, wherein said porous medium consists of a filtering cloth.

7. A method as claimed in claim 1, further comprising stabilizing a mixture of the plymer and crosslinking additive at the outlet of the porous and permeable medium.

8. A method as claimed in claim 7, wherein the mixture of the polymer and crosslinking additive is stabilized by diluting the mixture.

9. A method as claimed in claim 7, wherein the mixture of the polymer and crosslinking additive is stabilized by increasing the pH value of the mixture.

10. A method as claimed in claim 7, wherein the mixture of the polymer and crosslinking additive is stabilized by adding a complexing agent for the crosslinking additive.

11. A method as claimed in claim 1, wherein the polymer is polyacrylamide and the crosslinking additive is a complex compound of metallic zirconium ion.

\* \* \* \* \*